US011403288B2

(12) United States Patent
Subramanya et al.

(10) Patent No.: US 11,403,288 B2
(45) Date of Patent: *Aug. 2, 2022

(54) QUERYING A DATA GRAPH USING NATURAL LANGUAGE QUERIES

(71) Applicant: GOOGLE LLC, Mountain View, CA (US)

(72) Inventors: Amarnag Subramanya, Menlo Park, CA (US); Fernando Pereira, Palo Alto, CA (US); Ni Lao, Belmont, CA (US); John Blitzer, Mountain View, CA (US); Rahul Gupta, Foster City, CA (US)

(73) Assignee: GOOGLE LLC, Mountain View, CA (US)

(*) Notice: Subject to any disclaimer, the term of this patent is extended or adjusted under 35 U.S.C. 154(b) by 1 day.

This patent is subject to a terminal disclaimer.

(21) Appl. No.: 16/949,076

(22) Filed: Oct. 13, 2020

(65) Prior Publication Data
US 2021/0026846 A1 Jan. 28, 2021

Related U.S. Application Data

(63) Continuation of application No. 13/801,598, filed on Mar. 13, 2013, now Pat. No. 10,810,193.

(51) Int. Cl.
*G06F 16/245* (2019.01)
(52) U.S. Cl.
CPC ................. *G06F 16/245* (2019.01)
(58) Field of Classification Search
CPC ............ G06F 16/24578; G06F 16/243; G06F 16/245; G06F 16/242; G06F 16/244; G06F 16/24522; G06F 16/2453; G06F 16/24549

(Continued)

(56) References Cited

U.S. PATENT DOCUMENTS 6,141,659 A * 10/2000 Barker .................... G06F 16/33
7,430,552 B2 * 9/2008 Cameron ................ G06F 40/30
(Continued)

FOREIGN PATENT DOCUMENTS

WO     0014651 A1    3/2000
WO     2010085523 A1  7/2010

OTHER PUBLICATIONS

Agirre, Eneko, et al., "Personalizing PageRank for Word Sense Disambiguation", Proceedings of the 12th Conference of the European Chapter of the ACL, Association for Computational Linguistics, 2009, pp. 33-41.

(Continued)

*Primary Examiner* — James Trujillo
*Assistant Examiner* — Fariborz Khoshnoodi
(74) *Attorney, Agent, or Firm* — Brake Hughes Belermann LLP

(57) ABSTRACT

Implementations include systems and methods for querying a data graph. An example method includes receiving a machine learning module trained to produce a model with multiple features for a query, each feature representing a path in a data graph. The method also includes receiving a search query that includes a first search term, mapping the search query to the query, and mapping the first search term to a first entity in the data graph. The method may also include identifying a second entity in the data graph using the first entity and at least one of the multiple weighted features, and providing information relating to the second entity in a response to the search query. Some implementations may also include training the machine learning module by, for example, generating positive and negative training examples from an answer to a query.

18 Claims, 9 Drawing Sheets

(58) Field of Classification Search
USPC .......................................................... 707/781
See application file for complete search history.

(56) References Cited

U.S. PATENT DOCUMENTS

| | | | |
|---|---|---|---|
| 7,502,770 | B2 | 3/2009 | Hillis et al. |
| 7,587,387 | B2 | 9/2009 | Hogue |
| 7,672,937 | B2 | 3/2010 | Madhavan et al. |
| 7,765,206 | B2 | 7/2010 | Hillis et al. |
| 7,769,579 | B2 | 8/2010 | Zhao et al. |
| 7,774,328 | B2 | 8/2010 | Hogue et al. |
| 7,792,837 | B1 | 9/2010 | Zhao |
| 7,925,610 | B2 | 4/2011 | Elbaz et al. |
| 8,051,104 | B2 | 11/2011 | Weissman et al. |
| 8,122,026 | B1 | 2/2012 | Laroco et al. |
| 8,204,856 | B2 | 6/2012 | Meyer et al. |
| 8,271,480 | B2 | 9/2012 | Diab et al. |
| 8,370,128 | B2 | 2/2013 | Brun et al. |
| 8,898,159 | B2 | 11/2014 | Brown et al. |
| 9,224,103 | B1 | 12/2015 | Subramanya et al. |
| 2002/0055916 | A1* | 5/2002 | Jost ................... G06F 16/90332 |
| 2005/0278325 | A1 | 12/2005 | Mihalcea et al. |
| 2007/0239735 | A1* | 10/2007 | Glover ................. G06F 16/951 |
| 2008/0114743 | A1* | 5/2008 | Venkataraman ...... G06F 16/951 |
| 2008/0133483 | A1* | 6/2008 | Bayley .................. G06F 16/338 |
| 2008/0281764 | A1 | 11/2008 | Baxter |
| 2008/0306934 | A1 | 12/2008 | Craswell et al. |
| 2010/0121839 | A1 | 5/2010 | Meyer et al. |
| 2010/0145678 | A1 | 6/2010 | Csomai et al. |
| 2010/0228693 | A1 | 9/2010 | Dawson et al. |
| 2010/0257117 | A1 | 10/2010 | Shvadron et al. |
| 2010/0268710 | A1* | 10/2010 | Strehl ................. G06F 16/3326 |
| | | | 707/732 |
| 2010/0306155 | A1 | 12/2010 | Giannetto |
| 2010/0306166 | A1 | 12/2010 | Pantel et al. |
| 2010/0318546 | A1* | 12/2010 | Kenthapadi ......... G06F 16/9535 |
| | | | 707/759 |
| 2011/0040776 | A1 | 2/2011 | Najm et al. |
| 2011/0225152 | A1* | 9/2011 | Beaudreau .......... G06F 16/9535 |
| | | | 707/769 |
| 2012/0078825 | A1 | 3/2012 | Kulkarni et al. |
| 2013/0080461 | A1* | 3/2013 | Byrne ................. G06F 16/3329 |
| | | | 707/769 |
| 2014/0040181 | A1 | 2/2014 | Kuznetsov |
| 2014/0180815 | A1* | 6/2014 | Chatwin ............ G06Q 30/0275 |
| | | | 705/14.54 |
| 2015/0154493 | A1 | 6/2015 | Yagnik |

OTHER PUBLICATIONS

Sornlertlamvanich, et al., "Automatic Corpus-Based Thai Word Extraction with the C4.5 Learning Algorithm", Proceedings of the 18th Conference on Computational Linguistics, vol. 2, Association for Computer Linguistics, 2009, pp. 802-807.
Gabrilovich, et al., "Computing Semantic Relatedness using Wikipedia-based Explicit Semantic Analysis", IJCAI, 2007, pp. 1606-1611.
Haghighi, et al., "Robust Textual Inference via Graph Matching", Proceedings of Human Language Technology Conference and Conference on Empirical Methods in Natural Language Processing (HLT/EMNLP), Vancouver, Oct. 2005, pp. 387-394.
Kahng, et al., "Ranking Objects by Following Paths in Entity-Relationship Graphs", PIKM '11, Oct. 28, 2011, 8 pages.
Kurant, et al., "Walking on a Graph with a Magnifying Glass: Stratified Sampling via Weighted Walks", ACM Sigmetrics, Jun. 2011, pp. 381-392.
Lao, "Efficient Random Walk Inference with Knowledge Bases", Thesis, The Carnegie Mellon University, Jul. 2012, 139 pages.
Lao, et al., "Fast Query Execution for Retrieval Models Based on Path-Constrained Random Walks", KDD '10, Jul. 25-28, 2010, 8 pages.
Lao, et al., "Random Walk Inference and Learning in a Large Scale Knowledge Base",Conference on Empirical Methods in Natural Language Processing, Aug. 2011, 11 pages.
Lao, et al., "Reading the Web with Learned Syntactic-Semantic Inference Rules", Proceedings of the 2012 Joint Conference on Empirical Methods in Natural Language Processing and Computational Natural Language Learning, 2012, 10 pages.
Lao , et al., "Relational retrieval using a combination of path-constrained random walks", Mach Learn (2010) 81:53-67, Jul. 22, 2010, 15 pages.
Podgorelec, et al., "Decision Trees: An Overview and Their Use in Medicine", Journal of Medical Systems, vol. 26, No. 5, Plenum Publishing Corporation, Oct. 2002, pp. 445-463.
Singh, et al., "Large-Scale Cross-Document Coreference Using Distributed Inference and Hierarchical Models", Proceedings of the 49th Annual Meeting of the Association for Computational Linguistics: Human Language Technologies, vol. 1, 2011, 11 pages.
U.S. Appl. No. 13/801,598, filed Mar. 13, 2013, Allowed.

* cited by examiner

QUERYING A DATA GRAPH USING NATURAL LANGUAGE QUERIES

RELATED APPLICATION

This application is a continuation of, and claims priority to, U.S. application Ser. No. 13/801,598, filed Mar. 13, 2013, titled "Querying a Data Graph Using Natural Language Queries," the disclosure of which is incorporated herein in its entirety.

BACKGROUND

Large data graphs store data and rules that describe knowledge about the data in a form that provides for deductive reasoning. For example, in a data graph, entities, such as people, places, things, concepts, etc., may be stored as nodes and the edges between nodes may indicate the relationship between the nodes. In such a data graph, the nodes "Maryland" and "United States" may be linked by the edges of "in country" and/or "has state." The basic unit of such a data graph is a tuple that includes two entities and a relationship between the entities. Tuples may represent a real-world fact, such as "Maryland is a state in the United States." The tuple may also include other information, such as context information, statistical information, audit information, etc. Adding entities and relationships to a data graph has typically been a manual process, making the creation of large data graphs difficult and slow. The difficulty in creating large data graphs results in many "missing" entities and "missing" relationships between entities that exist as facts but have not yet been added to the graph. Such missing entities and relationships reduce the usefulness of querying the data graph.

SUMMARY

Some implementations extract syntactic and semantic knowledge from text, such as from the Web, and combine this with semantic knowledge from a data graph. The knowledge extracted from the text and the data graph is used as input to train a machine learning algorithm to predict tuples for the data graph. The trained machine learning algorithm may produce multiple weighted features for a given relationship, each feature representing an inference about how two entities might be related. The absolute value of the weight of a feature may represent the relative importance in making decisions. The trained machine learning algorithm can then be used to create additional tuples for the data graph from analysis of documents in a large corpus and from the existing information in the data graph. This method provides a large number of additional tuples for the data graph, greatly expanding the data graph. In some implementations, each predicted tuple may be associated with a confidence score and only tuples that meet a threshold are automatically added to the data graph. The facts represented by the remaining tuples may be manually verified before being added to the data graph.

Some implementations allow natural language queries to be answered from the data graph. In such implementations, the machine learning module can be trained to map features to queries, and the features being used to provide possible query results. The training may involve using positive examples from search records or from query results obtained from a document-based search engine. The trained machine learning module may produce multiple weighted features, where each feature represents one possible query answer, represented by a path in the data graph. The absolute value of the weight of the feature represents the relative importance in making decisions. Once the machine learning module has been properly trained with the multiple weighted features it can be used to respond to natural language queries using information from the data graph.

In one aspect, a computer-implemented method includes receiving, using at least one processor, a machine learning module trained to produce a model with multiple weighted features for a query, each weighted feature representing a path in a data graph. The method also includes receiving a search query that includes a first search term, mapping the search query to the query, mapping the first search term to a first entity in the data graph, and identifying a second entity in the data graph using the first entity and at least one of the multiple weighted features. The feature may also include providing information relating to the second entity in a response to the search query.

These and other aspects can include one or more of the following features. For example, in some implementations, the query may be a natural language query. As another example, the method may include training the machine learning model to produce the model. Training the machine learning module may include generating noisy query answers and generating positive and negative training examples from the noisy query answers. Generating the noisy query answers may include obtaining search results from a search engine for a document corpus, each result having a confidence score and generating the training examples can include selecting a predetermined number of highest scored documents as positive training examples and selecting a predetermined number of documents with a score below a threshold as negative training examples. In some implementations, obtaining search results includes reading search results from search records for past queries. In some implementations generating positive and negative training examples includes performing entity matching on the query answers and selecting entities that occur most often as positive training examples.

As another example, the method may also include determining a confidence score for the second entity based on the weight of the at least one weighted feature. In such implementations, identifying the second entity in the graph may also include selecting the second entity based on the confidence score and determining the confidence score for the second entity may include determining that two or more features connect to the second entity and using a combination of the weights of the two or more features as the confidence score for the second entity. In some implementations, In another aspect, a computer-implemented method includes training, using at least one processor, a machine learning module to create multiple weighted features for a query and receiving a request for the query. The method also includes determining a first entity from the request for the query, the first entity existing in a data graph having entities and edges and providing the first entity and the query to the machine learning module. The method may also include receiving a subset of the multiple weighted features from the machine learning module; and generating a response to the request that includes information obtained using the subset of the multiple weighted features.

These and other aspects can include one or more of the following features. For example, in some implementations, training the machine learning module can include selecting positive examples and negative examples from the data graph for the query, providing the positive examples, the negative examples, and the data graph to the machine learning module for training, receiving the multiple weighted features from the machine learning module, each feature representing a walk in the data graph, and storing at least some of the multiple weighted features in a model associated with the query.

In such implementations, a path length for the features may be limited to a predetermined length, the path length being the number of edges traversed in the path for a particular feature and/or the positive and negative examples are generated from search records for a document-based search engine. In some implementations, the multiple weighted features exclude features occurring less than a predetermined number of times in the data graph. As another example, generating the response to the query can include determining a second entity in the data graph with a highest weight and including information from the second entity in the response. In such an implementation, the weight of the second entity can be the sum of the weight of each feature associated with the second entity. In some implementations, the query represents a cluster of queries.

In another aspect, a computer system can include memory storing a directed edge-labeled data graph constructed using tuples, where each tuple represents two entities linked by a relationship, at least one processor, and a memory storing instructions that, when executed by the at least one processor, causes the computer system to perform operations. The operations can include receiving query, generating query answers for the query, generating positive and negative training examples from the query answers, and providing the positive examples, the negative examples, and the data graph to a machine learning module for training. In some implementations, the operations may also include receiving a plurality of features from the machine learning module for the query, and storing the plurality of features as a model associated with the query in the machine learning module.

These and other aspects can include one or more of the following features. For example, the features may be weighted features and the query may be a natural language query. In another example the plurality of features can exclude features that occur less than a predetermined number of times in the data graph and features with a probability of reaching a correct target that falls below a predetermined threshold. As another example, as part of generating query answers, the instructions, when executed by the at least one processor, cause the computer system to identify a query template for the query, examine search records for queries matching the query template, and obtain search results from the search records for queries matching the query template. In some implementations, as part of generating positive and negative training examples, the instructions, when executed by the at least one processor, cause the computer system to extract a source entity from a query in the search records that matches the query template, extract entities from the search results of the query that matches the query template, determine the number of times a target entity appears in the search results of the query that matches the query template, and use the source entity and the target entity as a positive training example if the number of times meets a threshold. In some implementations, the features are weighted features. In some implementations, each of the features has its own associated weight. In some implementations, a feature is a path through the data graph with an associated confidence score. The path may represent a sequence of edges in the data graph.

One or more of the implementations of the subject matter described herein can be implemented so as to realize one or more of the following advantages. As one example, implementations may automatically extend a data graph by reading relational information from a large text corpus, such as documents available over the Internet or other corpora with more than a million documents, and combine this information with existing information from the data graph. Such implementations can create millions of new tuples for a data graph with high accuracy. Some implementations may also map natural language queries to paths in the data graph in order to produce query results from the data graph. One of the difficulties with natural language queries is finding a match between the relationships or edges in the data graph to the query. Some implementations train the machine learning module to perform the mapping, making natural language querying of the graph possible without a manually entered synonym table that can be difficult to exhaustively populate, maintain, and verify.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
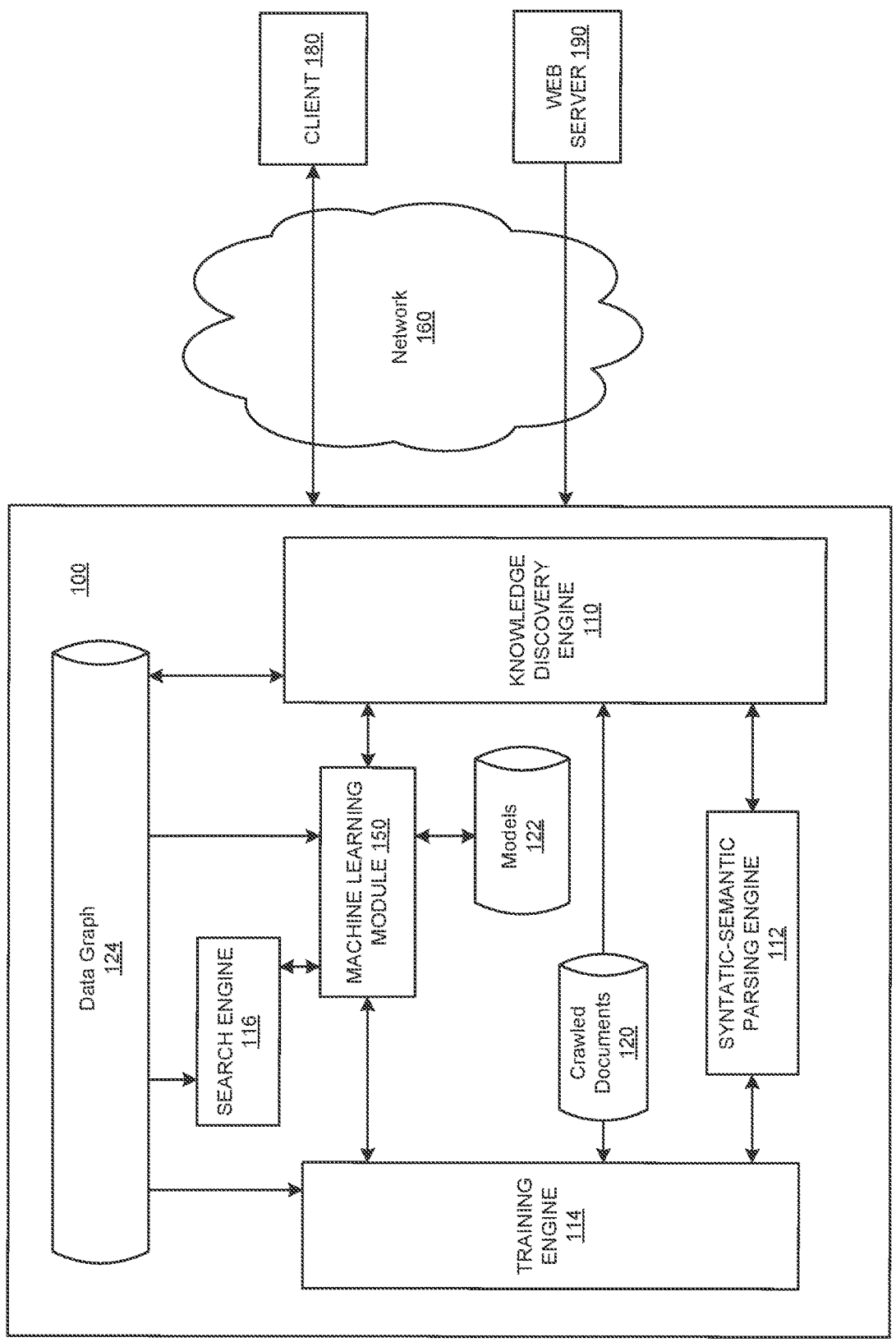
FIG. 1 illustrates an example system in accordance with the disclosed subject matter.

FIG. 1 is a block diagram of a syntactic-semantic inference system in accordance with an example implementation. The system 100 may be used to train a machine learning module to recognize multiple weighted features, or walks in the data graph, to generate new tuples for the data graph based on information already in the graph and/or based on parsed text documents. In some implementations, the system 100 can generate search results from the data graph from a natural language query. The depiction of system 100 in FIG. 1 is described as a system using documents available over the Internet. However, other configurations and applications may be used. For example, the documents may originate from another document corpus, such as internal documents not available over the Internet or another private corpus, from a library, from books, from a corpus of scientific data, or from some other large corpus.

Figure 8:
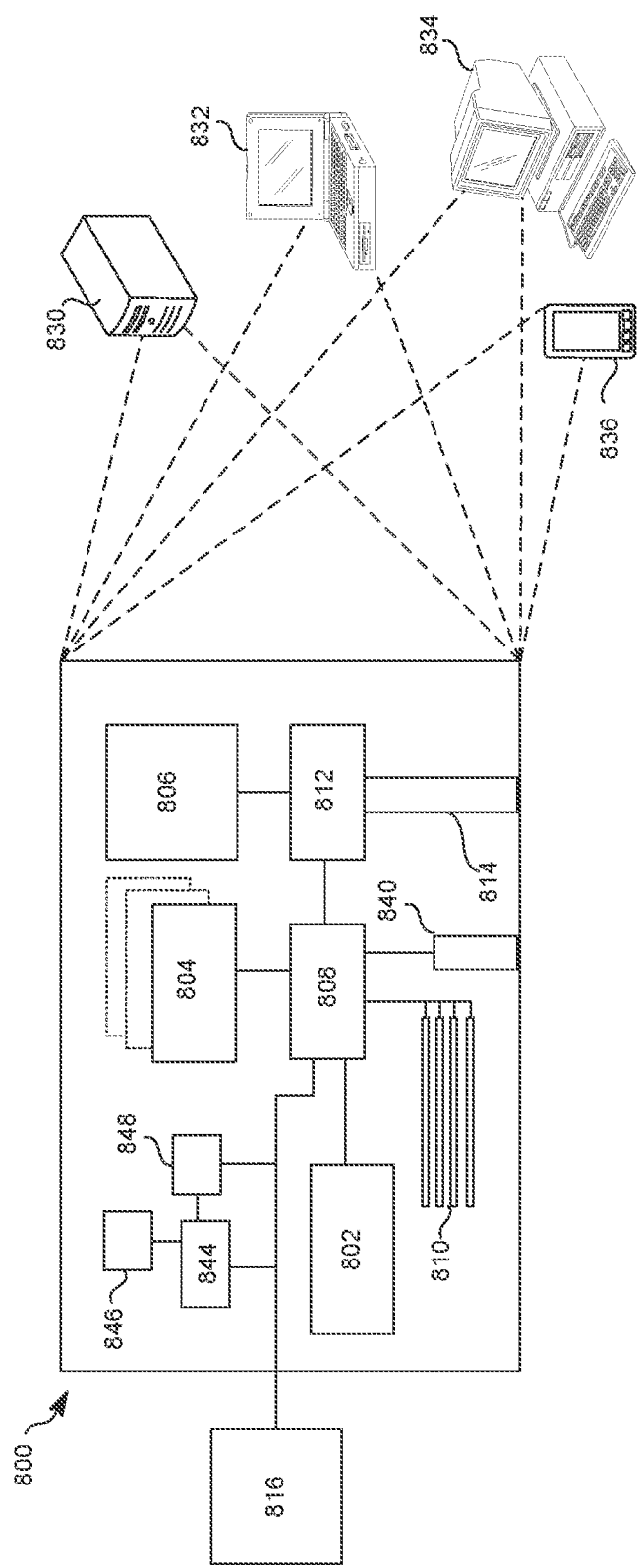
FIG. 8 shows an example of a computer device that can be used to implement the described techniques.
Figure 9:
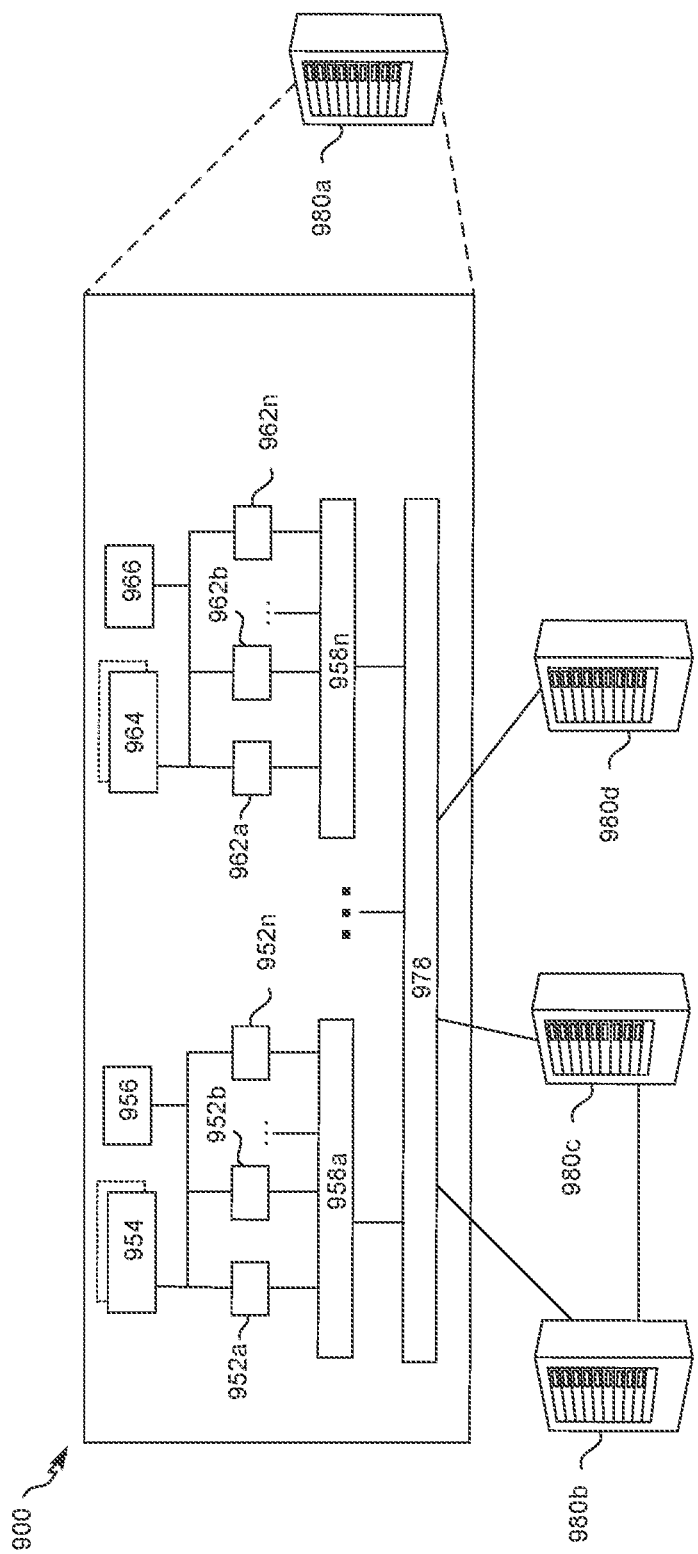
FIG. 9 shows an example of a distributed computer device that can be used to implement the described techniques.

The syntactic-semantic inference system 100 may be a computing device or devices that take the form of a number of different devices, for example a standard server, a group of such servers, or a rack server system. In addition, system 100 may be implemented in a personal computer, for example a laptop computer. The syntactic-semantic inference system 100 may be an example of computer device 800, as depicted in FIG. 8, or computer device 900, as depicted in FIG. 9.

The syntactic-semantic inference system 100 may include a data graph 124. The data graph 124 can be a directed edge-labeled graph. Such a data graph stores nodes and edges. The nodes in the data graph represent an entity, such as a person, place, item, idea, topic, abstract concept, concrete element, other suitable thing, or any combination of these. Entities in the data graph may be related to each other by edges, which represent relationships between entities. For example, the data graph may have an entity that corresponds to the actor Kevin Bacon and the data graph may have an acted in relationship between the Kevin Bacon entity and entities representing movies that Kevin Bacon has acted in. A data graph with a large number of entities and even a limited number of relationships may have billions of connections. In some implementations, data graph 124 may be stored in an external storage device accessible from system 100. In some implementations, the data graph 124 may be distributed across multiple storage devices and/or multiple computing devices, for example multiple servers.

Although not shown in FIG. 1, the syntactic-semantic inference system 100 can include one or more processors configured to execute one or more machine executable instructions or pieces of software, firmware, or a combination thereof. The syntactic-semantic inference system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include a knowledge discovery engine 110, a syntactic-semantic parsing engine 112, a training engine, and a search engine 116. The knowledge discovery engine 110 may use a text graph generated by syntactic-semantic parsing engine 112 from crawled document sources, such as crawled documents 120, to automatically generate new entities and/or new edges between entities in a data graph, such as data graph 124. The crawled documents 120 may be documents obtained using known or later developed web-crawling techniques, for example. In some implementations, the crawled documents 120 represent documents available over the Internet. For example, the crawled documents 120 may be indexed in an index used by a document search engine. The knowledge discovery engine 110 may link a text graph to the data graph by matching noun-phrases in the text graph to entities in the data graph. The linked text graph and data graph may be used as input to a trained machine learning module 150 that has been trained with syntactic-semantic inference rules. The trained machine learning module 150 may provide new tuples for the data graph. In some implementations, the knowledge discovery engine 110 may automatically add the new tuples to the data graph 124. In some implementations, the machine learning module 150 may provide a confidence score with each new tuple, and the knowledge discovery engine 110 may automatically add tuples that have a confidence score that meet a threshold and may forward the tuples that do not meet the threshold to a user for further review.

Figure 2:
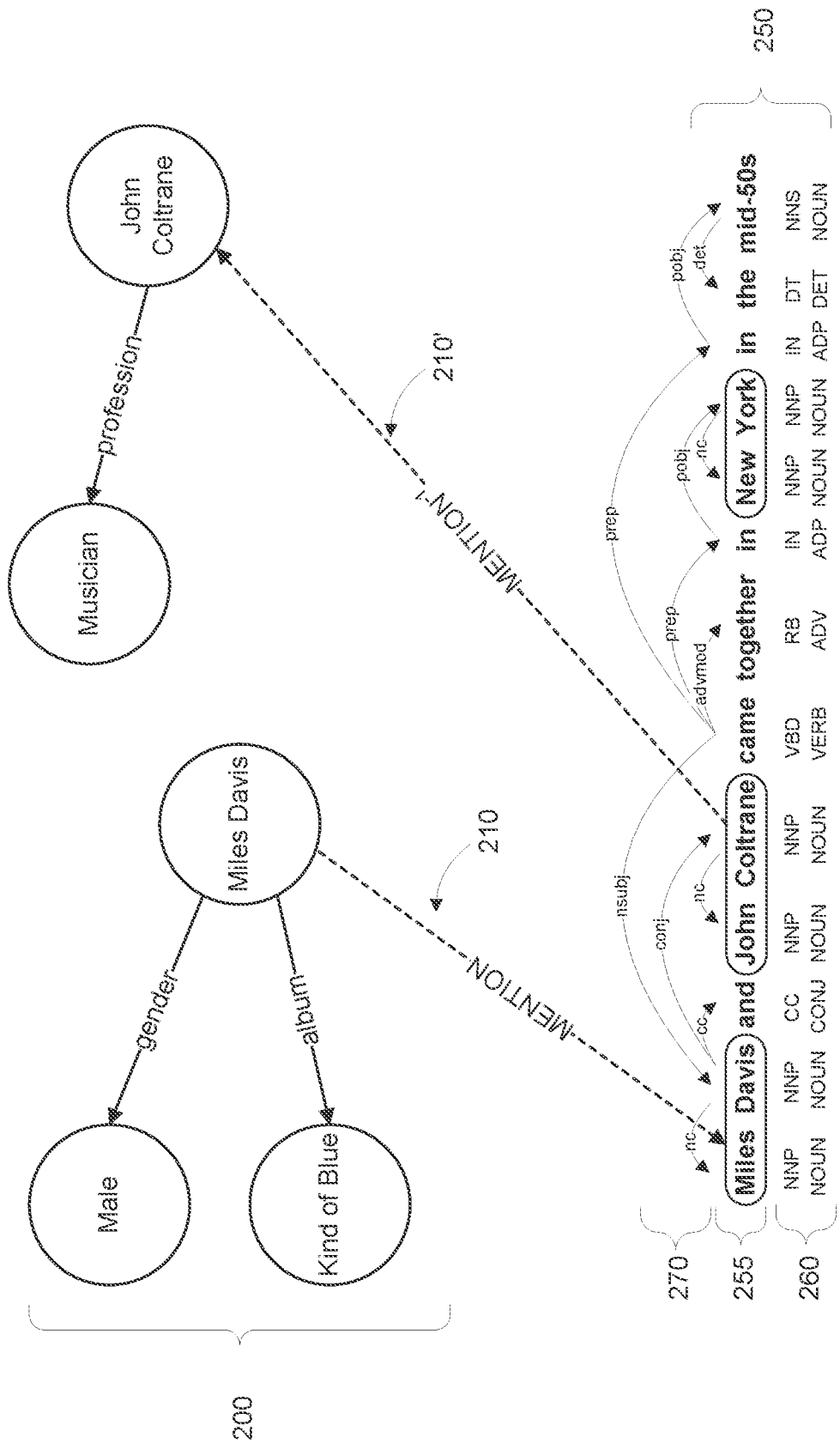
FIG. 2 illustrates an example of entities and relationships in a data graph linked to a text graph for a document.

The syntactic-semantic parsing engine 112 may analyze the crawled documents and generate a text graph for the documents. The syntactic-semantic parsing engine 112 may generate the text graph for a particular document by part-of-speech tagging, dependency parsing, noun-phrase extraction, and coreference resolution. FIG. 2 illustrates an example of a text graph. Part-of-speech tagging identifies the part of speech that each word in the text of the document belongs to, as represented by items 260 of FIG. 2. Dependency parsing identifies the relationships between the parts-of-speech. Dependency parsing creates a text graph for each sentence, with each edge labeled with a standard dependency tag, as represented by items 270 of FIG. 2. Noun-phrase extraction identifies, or segments, noun phrases such as the phrases "Barack Obama," "Secretary Clinton," or "First Lady." In other words, noun-phrase extraction aims to identify potential mentions of entities, including the words used to describe them. For example, in FIG. 2 the syntactic-semantic parsing engine 112 identifies noun-phrases of Miles Davis, John Coltrane, and New York, as indicated by the grouping of these words in line 255 of FIG. 2. Coreference resolution aims to match a pronoun or pronominal to a noun phrase. The syntactic-semantic parsing engine 112 may use any known or later developed method for part-of-speech tagging, dependency parsing, noun-phrase extraction, and coreference resolution. "Accurate Unlexicalized Parsing" by Klein et al. in the Proceedings of the 41$^{st}$ Annual Meeting on Association for Computational Linguistics, July 2003, and "Simple Coreference Resolution With Rich Syntactic and Semantic Features" by Haghighi et al. in Proceedings of the 2009 Conference on Empirical Methods in Natural Language Processing, August 2009, which are both incorporated herein by reference, provide examples of such methods.

Once the syntactic-semantic parsing engine 112 has generated a text graph for the sentences in a document, the text graph may be linked to the data graph 124. The syntactic-semantic parsing engine 112, the knowledge discovery engine 110, the training engine 114 may perform the linking. Linking may occur through entity resolution, or determining which entity from the data graph, if any, matches a noun-phrase in a document. Matches may receive a mention link between the entity and the noun phrase, as shown by links 210 and 210' of FIG. 2. Edge 210 represents an edge from the data graph entity to the noun-phrase in the document. Edge 210' represents the reverse edge, going from the noun-phrase to the entity. Thus, as demonstrated in FIG. 2, the edges that link the data graph to the text graph may lead from the entity to the noun-phrase in a forward direction, and from the noun-phrase to the entity in a reverse direction. Of course, forward edge 210 may have a corresponding reverse edge and reverse edge 210' may have a corresponding forward edge, although these edges are not shown in the figure.

The modules may also include training engine 114. In some implementations, the training engine 114 may be configured to use a text graph generated by the syntactic-semantic parsing engine 112 from crawled documents that is linked to the data graph 124 to generate training data for the machine learning module 150. Training engine 114 may generate the training data from random, path-constrained walks in the linked graph. The random walks may be constrained by a path length, meaning that the walk may traverse up to a maximum number of edges. Using the training data, training engine 114 may train machine learning module 150 to generate multiple weighted features for a particular relationship, or in other words to infer paths for a particular relationship. A feature generated by the machine learning module is a walk in the data graph alone or the combination of the data graph and text graph. For instance, if entity A is related to entity B by edge t1, and B is related to entity C by edge t2, then A is related to C by the feature {t1, t2}. The feature weight may represent a confidence that the path represents a true fact.

As one example, the training engine 114 may provide positive training examples that teach the machine learning algorithm to infer the profession of a person entity based on the professions of other persons mentioned in conjunction with the query person. Such a feature may appear as {Mention, conj, Mention$^{-1}$, Profession}, where Mention represents the mention edge that links the data graph to the text graph, conj is an edge in the text graph, Mention$^{-1}$ represents the mention edge that links the text graph to the data graph, and Profession is an edge in the data graph that links an entity for a person to an entity representing a profession. If a person entity in the data graph is linked to a profession entity in the data graph by this path, or feature, the knowledge discovery engine 110 can infer that the data graph should include a profession edge between the two entities. The feature may have a weight that helps the knowledge discovery engine 110 decide whether or not the edge should exist in the data graph. As another example, the machine learning module 150 may learn to infer a profession based on a mention of the person by their profession in documents. Such features may be learned by the machine learning module 150 based on the training data provided by training engine 114 and, once learned, may be stored in models 122 by relationship.

In some implementations, the training engine 114 may also be configured to train the machine learning module 150 to provide probable answers to a natural language query from the data graph 124. For example, the training engine 114 may train the machine learning module 150 using noisy query results for a query that relates to a query. For example, the training engine 114 may receive the query who directed and train the machine learning module 150 to find paths that link actor entities with directors, for example all of the directors that directed actor Kevin Bacon. As a result of the training, the machine learning module 150 may store multiple weighted features for the query. These features represent a path through the graph and the absolute value of the weight helps determine whether the path provides a correct answer to the query. In other words, the training engine 114 may be configured to train the machine learning module 150 to map terms from a natural language query to one or more paths in the data graph 124. As another example, the machine learning module 150 may be trained to map the queries for "spouse," "wife," "husband," "significant other," and "married to" to various paths in the data graph, based on the training data. In some implementations, the queries may be clustered, so that the machine learning module 150 may be trained for a cluster of queries. Thus, in some implementations, query refers to a cluster of queries with similar meaning. In some implementations query may also refer to a query template, such as who directed x, where x changes with each query. The machine learning module 150 may store the features for each query in models 122.

In some implementations, the machine learning module 150 may be similar to the path ranking algorithm described in "Relational Retrieval Using a Combination of Path-constrained Random Walks" by Lao et al. at pages 423-430 in the Proceedings of the 41$^{st}$ Annual Meeting on Association for Computational Linguistics (July 2010), which is incorporated herein by reference. As mentioned above, the machine learning module 150 requires training data and learns how to correctly infer paths based on the training data provided. An inferred path is also referred to as a feature, and the features produced by the machine learning module 150 may contain a maximum number of edges. Each feature may also have an associated weight that represents a confidence for the inference. Once features and their corresponding weights are learned, the machine learning module 150 stores the features as part of the models 122, with each set of features being stored for a particular relationship or a particular query. Thus, the machine learning module 150 can use the models 122 to respond to later-occurring requests involving the relationship or query. For example, after learning the two profession features mentioned above, the knowledge discovery engine 110 may use the machine learning module 150 to infer new tuples to be added to the data graph from parsed text documents, as explained in more detail with regards to FIGS. 3-4. As another example, the search engine 116 may use the trained machine learning module 150 to respond to natural language queries, as explained in more detail with regard to FIGS. 5-7.

The modules may also include the search engine 116. The search engine 116 may receive natural language queries, map the query to a trained model and to at least one entity, and use the machine learning module 150 to generate search results from the data graph 124. As previously mentioned, the machine learning module 150 may store models for various queries, each model including multiple weighted features for the query. The models may be stored in models 122, although the query models may be stored separately from the relationship models. Using the selected query model, the machine learning module 150 may provide features that produce probable answers to the query. The search engine 116 may use the probable answers in a search result delivered to the query requestor. Although not illustrated in FIG. 1, in some implementations, the search engine 116 may also obtain query results from other sources, for example as a document-based index and may combine the results from the data graph 124 with the results from the document-based index. In some implementations, the search engine 116 may provide the query results from the data graph 124 to another search engine or other module for combination with search results from other sources.

Syntactic-semantic inference system 100 may be in communication with client(s) 180 over network 160. Clients 180 may allow a user to monitor and direct the training of the machine learning module 150, to submit natural language queries to the search engine 116, or to verify and analyze tuples to be added to the data graph 124. Network 160 may be for example, the Internet, or the network 160 can be a wired or wireless local area network (LAN), wide area network (WAN), etc., implemented using, for example, gateway devices, bridges, switches, and/or so forth. Via the network 160, the syntactic-semantic inference system 100 may communicate with and transmit data to/from clients 180. In some implementations, syntactic-semantic inference system 100 may be in communication with or include other computing devices that provide updates to the data graph 124 and to the crawled documents 120. For example, syntactic-semantic inference system 100 may include or be in communication with an indexing engine that crawls web server(s) 190 for documents and indexes the contents of the documents. The syntactic-semantic inference system 100 represents one example configuration and implementations may incorporate other configurations. For example, some implementations may combine one or more of the knowledge discovery engine 110, the training engine 114, the syntactic-semantic parsing engine 112, and the search engine 116 into a single module or engine.

Expanding a Data Graph

Figure 3:
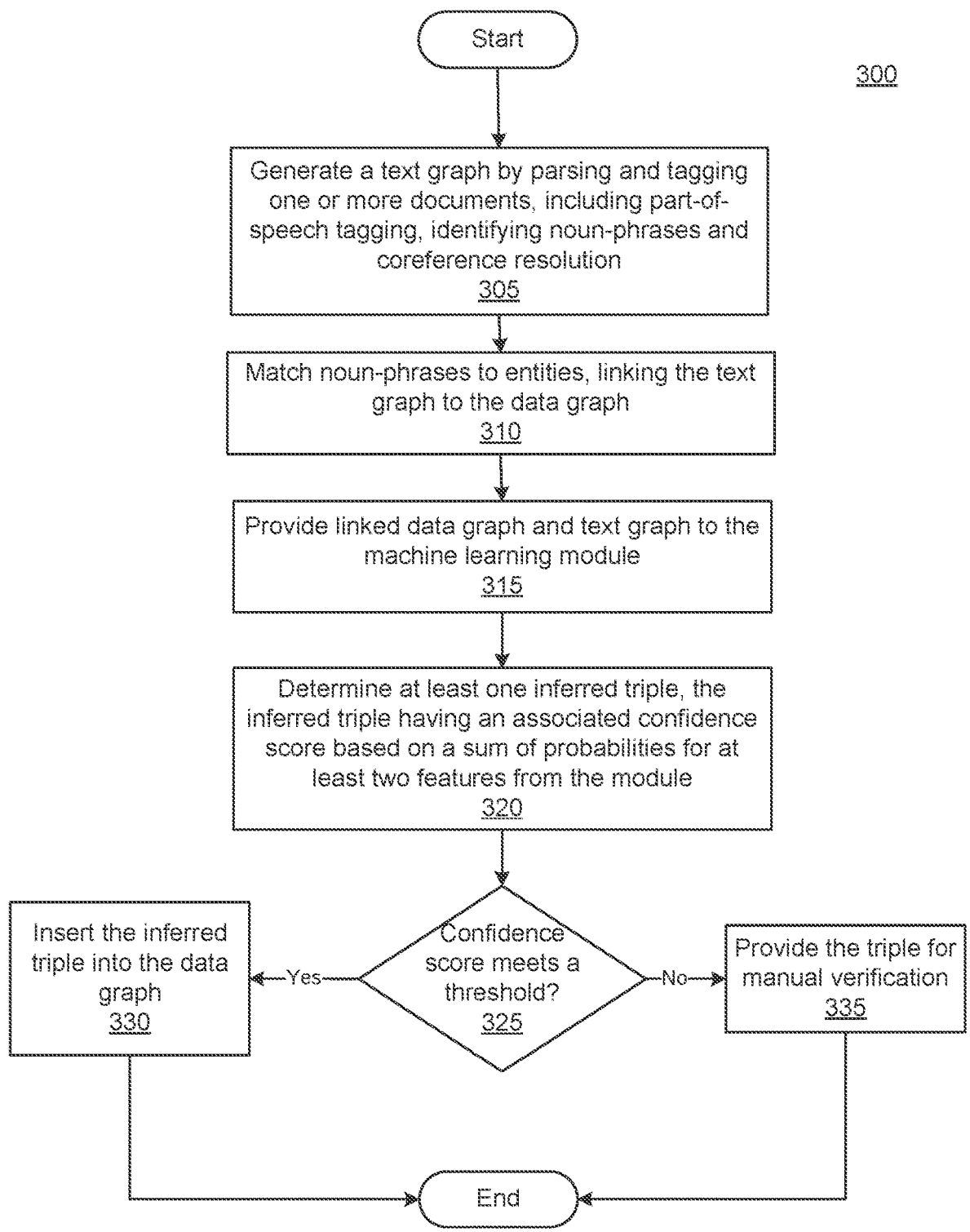
FIG. 3 illustrates a flow diagram of an example process for automatically creating tuples for a knowledge graph with high accuracy.

FIG. 3 illustrates a flow diagram of an example process 300 for automatically creating tuples for a knowledge graph with high accuracy. Process 300 may be performed by a syntactic-semantic inference system, such as system 100 of FIG. 1. Before process 300 may begin, the system may train a machine learning module to create multiple weighted features for a relationship in the data graph, as described below with regard to FIG. 4. The weighted features may be stored in a relationship model use in process 300 to create tuples. Training of the machine learning module may occur separately from generation of inferred tuples, but must occur at least once before generation of inferred tuples. Once the model is established, the system may use the model to automatically generate tuples for the data graph. Process 300 may begin by receiving one or more documents, for example documents available over the Internet. The documents may include any file with text, including web pages, PDF documents, word processing documents, presentation documents, database records, etc. The system may generate a text graph from the documents, for example, by part-of-speech tagging, dependency parsing, noun-phrase extraction, and coreference resolution (305). As indicated above, the system may use any known or later developed method for generating the text graph. In some implementations, a large number of documents are received and included in the text graph, for example millions of documents The system may then match noun-phrases from the text graph to entities in the data graph (310). The matching creates edges between the text graph and the data graph, linking the two together. Thus, the system can walk the combined graphs to infer new tuples for the data graph based on the model stored by the machine learning module. In some implementations, steps 305 and 310 may have been performed as part of steps 405 and 410 of FIG. 4 when training the model. For example, the system may generate the linked data graph and text graph to train the model and then use the same graph as input for automatically creating the tuples. In some implementations, the model may be trained using a linked data graph and text graph that is distinct from the linked data graph and text graph used to create the tuples. The system may provide the linked data graph and text graph to the machine learning module (315). The machine learning module may apply the model to the linked graphs and generate one or more inferred tuples (320). In applying the model for a particular relationship to the linked graphs, the machine learning module may attempt to apply the multiple features from the model to entities in the data graph that do not have the particular feature in order to produce as many new tuple suggestions as possible.

Each inferred tuple may be associated with a confidence score. The confidence score may reflect the sum of probabilities generated by the machine learning module. For example, the machine learning module may have generated three features for a profession relationship. For an entity A in the text graph that does not have a profession in the data graph, the machine learning module may use the features to determine whether a matching profession can be determined. For example, the machine learning module may attempt to use each feature to arrive at a profession entity for A. For each feature that produces a profession, a weight is assigned. If all three features arrive at the same profession B, the weights are added together to provide a confidence score for the new tuple <A, profession, B>. If two features include profession B and the third feature includes profession C, the weights of the two features may be added together for a confidence score for <A, profession, B> and the weight of the third feature may be a confidence score for <A, profession, C>. Because it is possible for a person to have two professions, for example a singer-actress, or a doctor-senator, both tuples may represent valid inferences.

The system may then check the confidence score for the inferred tuples against a threshold (325). If the confidence score for any particular inferred tuple meets the threshold (325, Yes), the system may automatically insert the tuple into the data graph without any intervention by a user (330). If the confidence score of any of the inferred tuples does not meet the threshold (325, No), the system may provide the tuple to a user for verification (335) rather than automatically adding it to the data graph. The user may do some investigation to determine whether the tuple should be added manually, but the inferred tuple may not be automatically added to the data graph. If multiple inferred tuples are provided by the machine learning module in step 325, steps 325-335 may be repeated for each inferred tuple. When all inferred tuples have been either added or provided for manual verification, process 300 may end. If the data graph and text graph are large, the system may find tens of thousands, or even hundreds of thousands, of additional tuples to add to the data graph.

Figure 4:
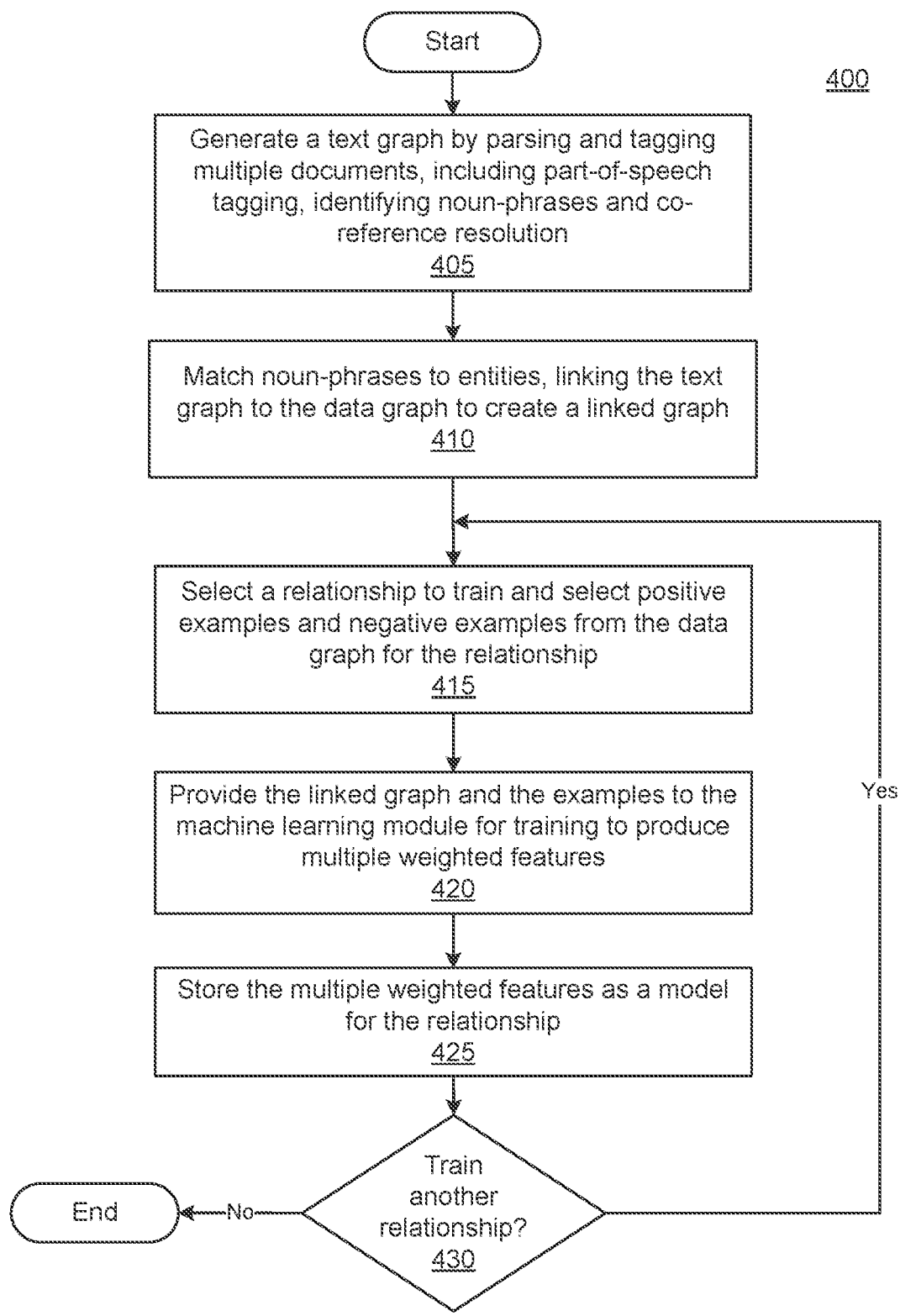
FIG. 4 illustrates a flow diagram of an example process for training a machine learning module to learn multiple weighted features for data graph relationships.

FIG. 4 illustrates a flow diagram of an example process 400 for training a machine learning module to learn multiple weighted features. Process 400 may be performed by a syntactic-semantic inference system, such as system 100 of FIG. 1. In some implementations, process 400 may be performed by a training engine in the syntactic-semantic inference system. Training of the machine learning module may occur separately from generation of inferred tuples, but must occur once before generating inferred tuples. Process 400 may begin with the system generating a text graph from a plurality of documents (405). The documents may be crawled documents that have been indexed for searching. The system may generate the text graph, as indicated above, though part-of-speech tagging, dependency parsing, noun-phrase extraction, and coreference resolution. The text graph 250 of FIG. 2 represents an example of a text graph from a sentence in a document. While the text graph 250 of FIG. 2 illustrates forward edges, the text graph may also include reverse edges, such as $conj^{-1}$, that link the parts of speech. For example, although not illustrated in FIG. 2, a $conj^{-1}$ edge may exist between Davis and Coltrane. Thus, the system may infer that each forward edge in the text graph has a corresponding reverse edge.

The system may then link noun-phrases in the text graph to entities in the data graph to create a linked graph (410). Such links may be made based on a description in the data graph for an entity. For example, each entity may be associated with words or n-grams that can be used to match the noun-phrases in the text. The links may be referred to as mentions, and are represented by links 210 and 210' of FIG. 2. Forward mentions may link the entity in the data graph to the noun-phrase in the text graph and reverse mentions may link the noun-phrase in the text graph to the entity in the data graph. Each entity/noun-phrase pair may have both forward and reverse mention links in the linked graph.

In some implementations, the system may include a sample of sentences for linking to the entity graph. For example, the system may select a sample of popular noun-phrase mentions to ensure that the text graph is not heavy-tailed. To prevent the text graph from being dominated by head (popular) concepts, the system may use stratified sampling. For example, the system may count the number of sentences that include entity c. The system may sample the sentences according to the formula $$P_c = \min\left(1, \frac{\sqrt{k+S}}{S}\right)$$

where S represents the number of sentences that include entity c, and k is a constant, for example 10,000. Thus, if the entity c appears much more often than k times, the system may sample about $\sqrt{S}$ of the sentences that contain a mention of c. Otherwise, all of the sentences that include c may be included in the text graph. If a sentence is not selected by the sampling, it is not included in the linked graph provided to the machine learning module.

The system may select a relationship to train and provide positive and negative training examples for the relationship (415). For example, if many person entities in the data graph are missing professions, the system may train the machine learning module to infer professions from the linked graph. The user may provide the system with the desired relationship. The system may then select a sample of entities from the data graph that have a profession to use as positive examples. To encourage the machine learning algorithm to find multiple paths, the system may remove the profession edge from linked graph for the entities represented by the positive examples. For example, if a profession edge exists between the Miles Davis entity and the Musician entity in the linked graph, and {Miles Davis, Musician} is provided as a positive training example, the system may remove the profession edge from the linked graph, or otherwise indicate to the machine learning module that the profession edge leading from Miles Davis cannot be considered. This forces the machine learning module to find other paths that link Miles Davis to Musician.

Furthermore, to avoid bias in the training set, causing the machine learning module to predict professions that occur more often in the data graph, the system may use stratified sampling in example selection. For example, if a training set for relationship r is desired, the system may count the number of r edges pointing to a particular entity t. The system may sample the edges r pointing to entity t according to the formula $$P_{r,t} = \min\left(1, \frac{\sqrt{m+N}}{N}\right),$$

where m is a constant, such as 100, and N is the number of edges r pointing to entity t. When N is much less than the constant m, all occurrences of edge r pointing to entity t are included in the sample. If N is much greater than m, only $\sqrt{N}$ of the possible paths to t will be sampled. The sampling is performed for each possible value of t in the data graph. The samples result in a set of tuples where an entity s is connected to entity t by relation r, for example <s, r, t>. The system may also select negative training examples from the data graph. Negative training examples may include entities of a type that is compatible with the relationship but do not have the relationship in the data graph. For example, if the relationship is profession, entities representing people are of a type compatible with the profession relationship. Therefore, person entities in the data graph that do not have a profession relationship may be selected for negative examples.

The system may then provide the linked graph, the positive training examples, and the negative training examples to the machine learning module (420). The machine learning module uses the training examples to generate the features for the relationship by performing random walks in the graph to determine whether the paths that exists from a given entity to another entity. The paths may be restrained to a certain length, for example no more than four edges. The path length is the number of edges traversed to arrive at the ending entity t from the starting entity s. In some implementations, the path length may be restricted to four edges. To encourage the machine learning module to find paths involving the text graph, some implementations may exclude the mention edges that link the data graph to the text graph from the path length.

Once the possible paths are found for the training set, the machine learning module may analyze the features. For example, in some implementations, for features to be stored in the model, the feature must be active for a minimum number of training examples. A feature is active for a given entity when the path can be followed from the given entity to another entity. In some implementations, for the feature to be stored in the model the probability of reaching a correct target must meet a threshold. In other words, the features that are highly active and highly correct are stored in the model. The more often a feature is active and correct, the higher the weight assigned by the machine learning module. In some implementations, the machine learning module may use $L_1/L_{2/2}$ regularized logistic regression to learn feature weights.

In some implementations, for a large linked graph, the machine learning module may use a distributed processing approach. For example, the system may be a distributed system configured to use a map-reduce strategy for finding paths. In the map-reduce strategy, the query nodes may find all paths up to the maximum length for the starting entities for its examples and send the results back to the root node in the reduce stage. The result of the training through random walks may be hundreds of features with non-zero weights. The system may store the features and their weights in the model (425) so that the model can be used to generate inferred tuples for the data graph. As indicated above, in some implementations only highly active, highly correct features may be stored in the model. If other models are to be built for other relationships (430, Yes), the system may receive another relationship and repeat steps 415 through 430. If not (430, No), process 400 ends. The models produced by the training are then ready for use in the generation of new tuples for the data graph, as described with regard to FIG. 3.

Natural Language Queries

Figure 5:
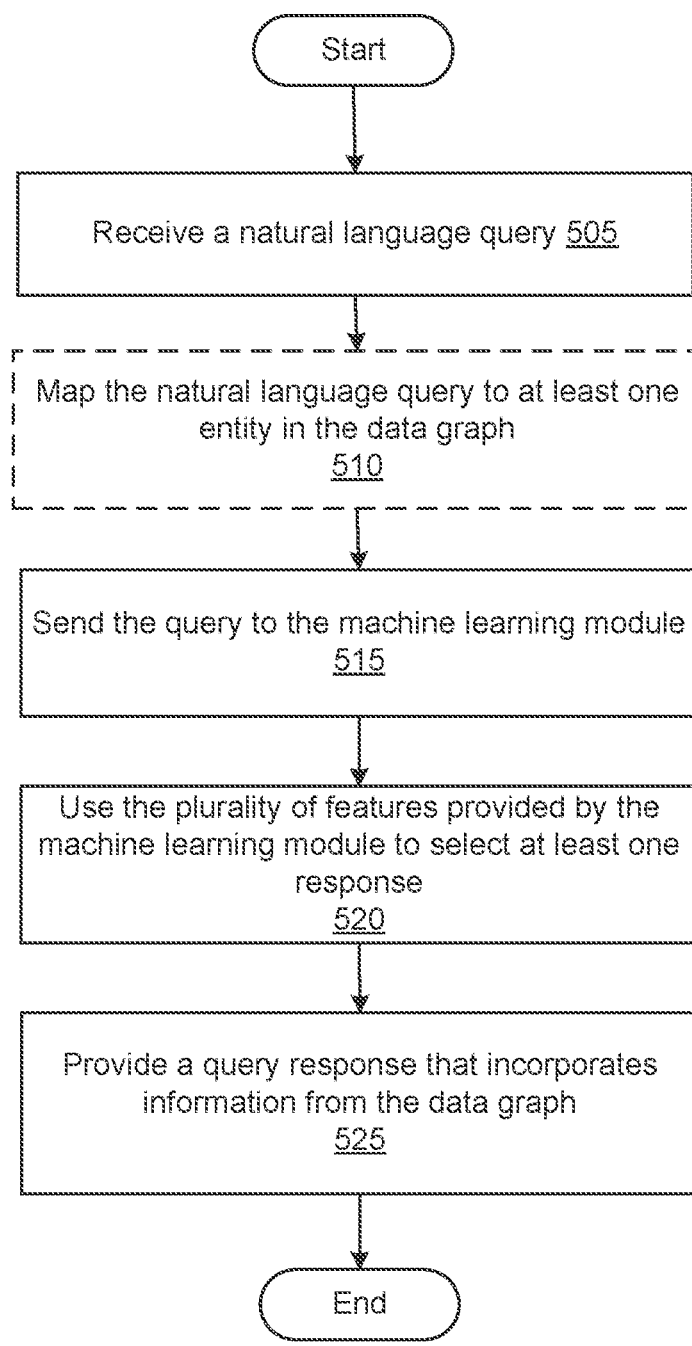
FIG. 5 illustrates a flow diagram of an example process for generating query results for a natural language query from the data graph.

Some implementations may enable natural language queries to be answered from the data graph. A difficulty in answering a natural language query is determining what relationships in the graph would answer the query. FIG. 5 illustrates a flow diagram of an example process for generating query results for a natural language query from paths in the data graph. Process 500 may be performed by a syntactic-semantic inference system, such as system 100 of FIG. 1. Process 500 may begin after training a machine learning module to create multiple weighted features for a query. Training of the machine learning module may occur separately from natural language query processing but must occur for at least one query before the machine learning module can be used to map a natural language query to features in the data graph. After the machine learning module has at least one query modeled, process 500 may begin when the system receives a query (505). The system may determine that the query has been modeled by determining if the query matches a template associated with the model, by determining if the query includes a word or phrase associated with one of the models, or through some other means. The system may also determine that the query relates to at least one entity in the data graph (510). This entity may be referred to as a source entity, and the query may map to multiple source entities. The system may use entity resolution, as described above with regard to step 315 of FIG. 3, to map the query to the entity. For example, if the query is "Who is Barack Obama's spouse" the system may identify Barack Obama as a noun-phrase that maps to the entity Barack Obama in the data graph. As another example, the query "who are the spouses of US presidents" may map to the entities that represent US presidents. Step 510 may be optional, as indicated by dashed lines because the query may not map to any entity in the data graph. In such a situation every entity in the data graph may be a possible source entity or the feature returned from the machine learning module may implicitly supply one or more source entities. For example, the feature for the query "who is the first US president" may be a path that starts at the George Washington entity and follows no edge.

The system may then send the query to the machine learning module (520). The machine learning module may use the model corresponding to the query to return the set of learned features. The features represent different paths that produce probable answers to the query. The system may use the features to determine the probable answers for the query (520). The probable answers may be obtained by following the paths represented by the features. If the query maps to one or more entities, the system may follow the path from the source entity to other entities in the data graph. In other words, the system may start at the source entity and attempt to follow a path from one of the features to a target entity. If a target entity is reached, the feature is active for that source entity, and the target entity may be assigned a confidence value corresponding to the weight of the feature. If another feature leads to the same target entity, the confidence score of the target entity may be boosted. For example, using the data graph illustrated in FIG. 7 and a natural language query of "who is Barack Obama married to," if one feature represents sharing one or more children and another feature represents living at the same address, and both features name Michelle Obama as the inferred answer, the weights of the two features may be added together to produce a confidence score for the Michelle Obama target entity. As indicated above, probable answers may be obtained by the features themselves without a source entity. For example, the feature may include an entity with no edges. The probable answer for such a query is the entity from the feature.

The system may select one or more of the possible responses, for example by selecting the responses with a confidence score that meets a threshold. In some implementations, the system may select a predetermined number of the responses with the highest confidence scores, or the system may select all responses that meet a predetermined threshold. In some implementations, the system may select a predetermined number of the responses that meet the threshold. The system may then incorporate the selected responses into a query response (525) and provide the query response to the user. Process 500 then ends. Of course, the query results may also include results from other sources, for example, a document search engine, in addition to the results from the data graph.

Figure 6:
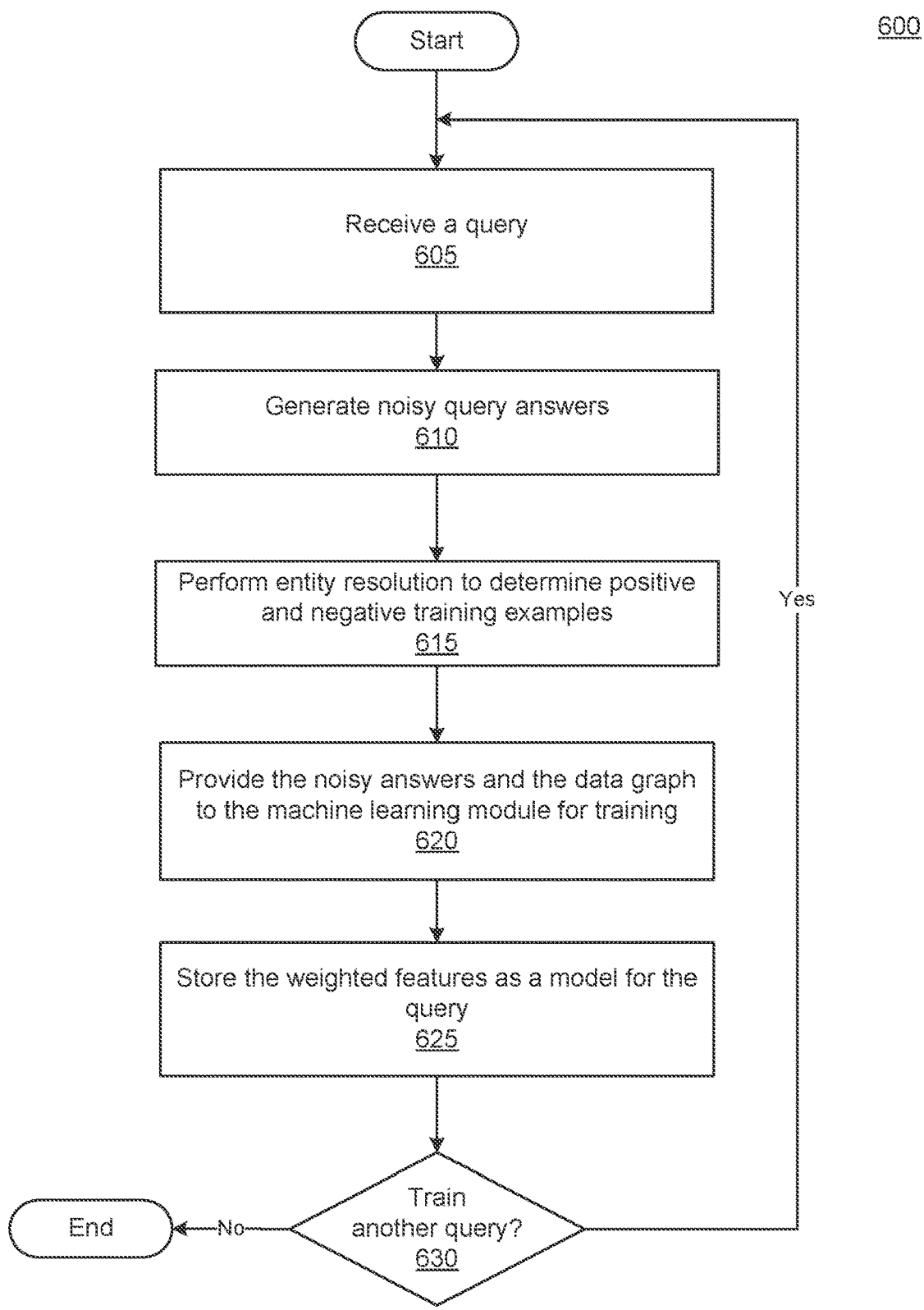
FIG. 6 illustrates a flow diagram of an example process for training a machine learning module to map a natural language query to multiple weighted features in the data graph.
Figure 7:
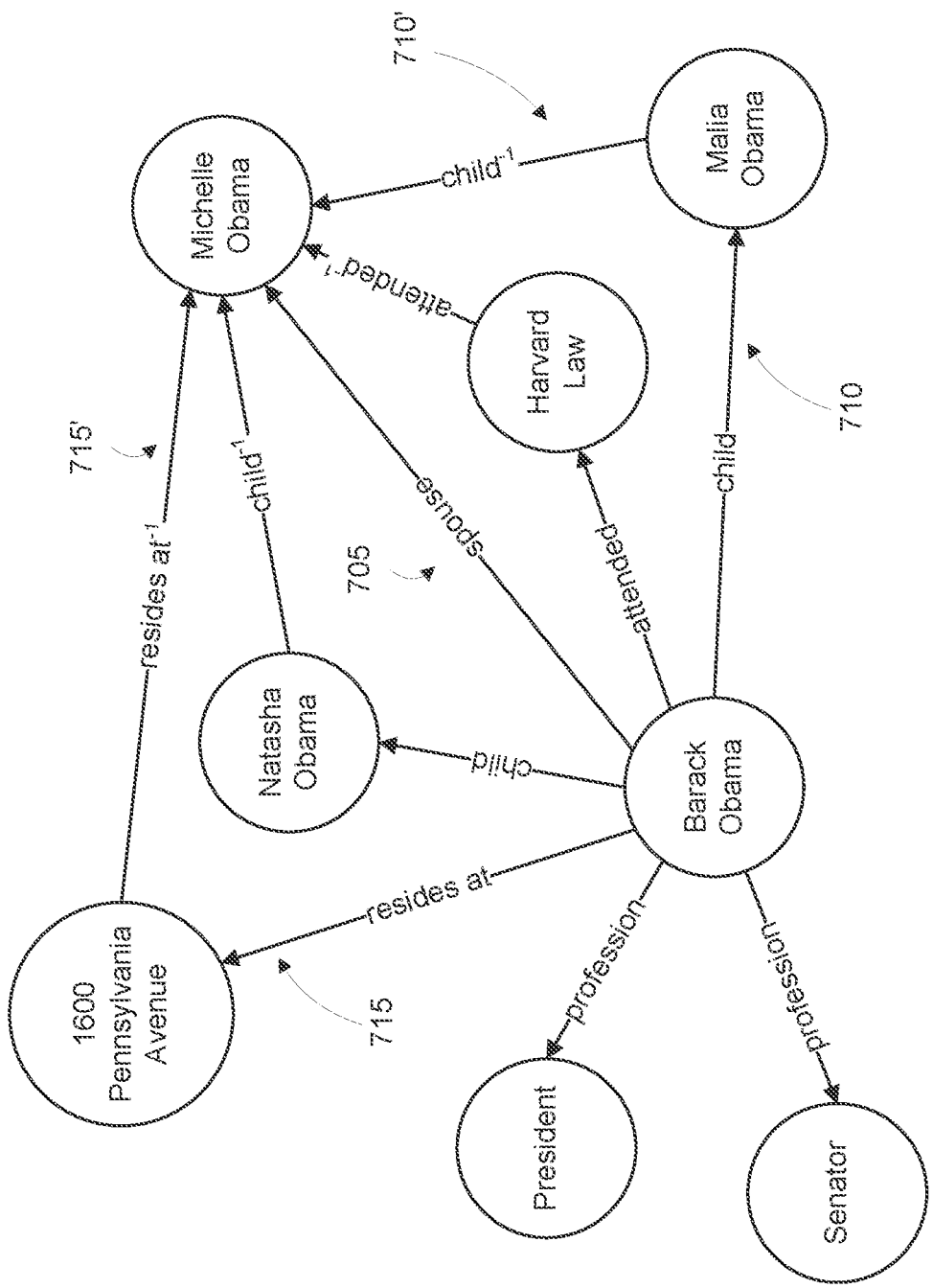
FIG. 7 illustrates an example of entities and relationships in a partial data graph.

FIG. 6 illustrates a flow diagram of an example process 600 for training a machine learning module to map a natural language query to multiple weighted features in the data graph. Process 600 may be performed by a syntactic-semantic inference system, such as system 100 of FIG. 1. In some implementations, process 600 may be performed by a training engine in the syntactic-semantic inference system. Training of the machine learning module may occur separately from natural language query processing but must occur for at least one query before the machine learning module can be used to map a natural language query to features in the data graph. Process 600 may begin with the system receiving a query to be trained (605). The query may be provided by a user and can be used as a query template associated with the trained model. For example, the system may turn the query "who directed Kevin Bacon" into a template of "who directed E," where E is an entity in the data graph. The system may also determine that who directed is the query to be trained and associated with the model. In some implementations, the query may be a cluster of queries with similar terms, such as "spouse," "married to," etc. The system may generate positive and negative training examples for the query by generating noisy query answers (610). In some implementations, the noisy query answers may be supplied by a black box that returns answers. In some implementations, the black box may be a document-based search engine that searches a corpus of documents in response to a query. In some implementations, the noisy query answers may be determined from search records for the document-based search engine.

The system may then perform entity resolution on the query answers to determine positive and negative training examples (615). For example, the query answers may include documents, such as web pages, blogs, PDFs, etc, that can be analyzed for entity mentions. The system may determine what possible entities are mentioned in the pool of query answers and match the entity mentions with entities in the data graph, as described above. Depending on how often the entity appears in the documents, and the confidence score of the particular documents, the system may determine positive and negative training examples. For example, if an entity appears often in the set of query answers for relevant answers, the entity may be considered a positive training example. The system may consider entities that are named but not often or in answers with low confidence scores negative training examples. In some implementations, the search records may include a relevance score that can be used as a confidence score for the entities identified in the document. The system may give a boost to the scores of entities that appear in a higher ranked document but not to entities that appear in a lower ranked document.

For example, if the example query is "who is E married to," the system may examine search records for queries matching the template. Search records may include query logs and other data gathered from queries. For the responses found, the system may determine the source entity E from the search records, and analyze the query results for possible target entities. As indicated above, a confidence score may help determine which source-target pairs are positive examples and which are negative examples. The source entity and target entities may be provided to the machine learning module for training (620). The machine learning module may then walk the data graph from the source entities to determine the paths, or features, with a probability of correctly arriving at the target entity. Using the data graph of FIG. 7, if Barack Obama is the source entity and Michelle Obama as the target entity, the machine learning module may find the features {spouse}, {child, child$^{-1}$}, {resides at, resides at$^{-1}$}, and {attended, attended$^{-1}$} as paths that connect Barack Obama to Michelle Obama. This path search may be repeated for many other starting and target entity pairs. Through this training, the machine learning module may determine that the first three features have a high probability of predicting the positive examples and negative examples, but that the last feature {attended, attended$^{-1}$} does not. In other words, while {attended, attended$^{-1}$} occurs for a minimum number of training examples, it arrives at the wrong answer too often. Thus, in some implementations that feature may not be included in the model, or the feature may receive a very low weight.

When training is complete, the machine learning module may store the weighted features as a model for the query (625). The system may store the model for future use in processing queries, as explained above with regard to FIG. 5. If other training is to be performed for another query (630, Yes), process 600 may repeat with the next query. Otherwise (630, No), process 600 ends.

FIG. 8 shows an example of a generic computer device 800, which may be operated as system 100, and/or client 170 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a personal computer such as a laptop computer 822, or smart phone 836. An entire system may be made up of multiple computing devices 800 communicating with each other. Other configurations are possible.

FIG. 9 shows an example of a generic computer device 900, which may be system 100 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900. Some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by at least one processor, a search query that includes a first search term;
determining, using the at least one processor, that the search query matches a query template;
mapping the first search term to a first entity in a data graph;
obtaining, using the at least one processor, a path from a model associated with the query template, the model being trained to provide the path for the query template, the path having a score representing a probability that the path provides a correct answer for the query template;
identifying, using the at least one processor, a second entity in the data graph by following the path in the data graph from the first entity; and
providing, using the at least one processor, information relating to the second entity in a response to the search query.

2. The computer-implemented method of claim 1, further comprising:
training the model to produce the path for the query template.

3. The computer-implemented method of claim 1, wherein determining that the search query matches the query template includes:
determining that the first search term matches a source entity placeholder in the query template; and
determining that a reminder of the search query matches a remainder of the query template.

4. The computer-implemented method of claim 1, wherein the model provides plurality of candidate paths, the path being a highest scoring path of the plurality of candidate paths.

5. The computer-implemented method of claim 1, further comprising:
mapping the first search term to at least two entities in the data graph, the first entity being one of the at least two entities, wherein identifying the second entity occurs for each entity of the at least two entities, resulting in at least two second entities, and wherein providing the information includes providing information relating to the at least two second entities.

6. The computer-implemented method of claim 1, wherein the search query is a natural language query.

7. A computer-implemented method, comprising:

training, using at least one processor, a machine-learned model to associate a query template for a first query to a weighted feature, the query template including a source entity variable, the weighted feature representing one path in a data graph that starts at the source entity variable and includes a target entity that answers the first query, the path having a score representing a probability that the target entity is a correct answer;

receiving a user request matching the query template;

determining, using the at least one processor, a first entity from the user request matching the source entity variable in the query template, the first entity existing in the data graph;

receiving at least a highest scoring path from the machine-learned model responsive to providing the first entity to the machine-learned model;

identifying, using the at least one processor, a second entity in the data graph using the first entity and the highest scoring path; and generating a response to the user request that includes information relating to the second entity.

8. The computer-implemented method of claim 7, wherein the information is a name of the second entity.

9. The computer-implemented method of claim 7, wherein the query template is generated from a cluster of queries with similar meaning.

10. The computer-implemented method of claim 7, wherein training the machine-learned model includes:

identifying a plurality of source entities from the data graph that satisfy the source entity variable for the query template;

identifying, for each source entity in the plurality of source entities, a set of target entities connected to the source entity in the data graph, generating a plurality of source entity-target entity pairs;

generating training examples by assigning each source entity target-entity pair in the plurality of source entity-target entity pairs to either a positive example or negative example based on a confidence score for the target entity; and training the machine-learned model using the training examples.

11. The computer-implemented method of claim 10, wherein training the machine-learned model includes:

for each source entity-target entity pair, identifying paths in the data graph of up to a predetermined path length that connect the source entity with the target entity; and excluding an identified path that, during a testing phase of the training, arrive at a wrong answer more than a correct answer.

12. The computer-implemented method of claim 7, wherein the score is a confidence score.

13. The computer-implemented method of claim 7, wherein the machine-learned model provides a plurality of candidate paths, the path being the highest scoring path of the plurality of candidate paths.

14. A system, comprising:

at least one processor; and memory storing instructions that, when executed by the at least one processor causes the system to perform operations including:

receiving an entity for a query, the entity existing in an entity graph;

identifying a path in the entity graph associated with the query, the path being predicted by a machine-learned model and having a score representing a probability that the path provides a correct answer;

starting from the entity in the entity graph, following the path to identify a second entity; and providing information about the second entity in response to the query.

15. The system of claim 14, wherein the entity is a named entity in the query.

16. The system of claim 14, wherein the machine-learned model is trained by:

identifying a plurality of source entities from the entity graph for the query;

identifying, for each source entity in the plurality of source entities, a set of target entities connected to the source entity in the entity graph, generating a plurality of source entity-target entity pairs;

generating training examples by assigning each source entity target-entity pair in the plurality of source entity-target entity pairs to either a positive example or negative example based on a confidence score for the target entity, wherein the confidence score represents a probability that the target entity is a correct answer to the query for the source entity; and training the machine-learned model using the training examples.

17. The system of claim 16, wherein training the machine-learned model includes:

for each source entity-target entity pair, identifying paths in the entity graph of up to a predetermined path length that connect the source entity with the target entity; and excluding an identified path that, during a testing phase of the training, arrive at a wrong answer more than a correct answer.

18. The system of claim 14, wherein the instructions further include instructions that cause the system to perform operations including:

identifying a plurality of entities for the query, the entity being one of the plurality of entities, each of the plurality of entities existing in the entity graph, wherein identifying the second entity occurs for each entity of the plurality of entities, resulting in at least two second entities, and wherein providing the information includes providing information relating to the at least two second entities.

* * * * *